United States Patent
Chi et al.

(10) Patent No.: US 11,565,284 B2
(45) Date of Patent: Jan. 31, 2023

(54) CROP HARVESTING ROBOT

(71) Applicant: Four Growers, Inc., Pittsburgh, PA (US)

(72) Inventors: Yun Nuo Chi, Pittsburgh, PA (US); Brandon M. Contino, Pittsburgh, PA (US)

(73) Assignee: Four Growers, Inc., Pittsburgh, PA (US)

( * ) Notice: Subject to any disclaimer, the term of this patent is extended or adjusted under 35 U.S.C. 154(b) by 470 days.

(21) Appl. No.: 16/776,633

(22) Filed: Jan. 30, 2020

(65) Prior Publication Data

US 2020/0246839 A1     Aug. 6, 2020

Related U.S. Application Data (60) Provisional application No. 62/799,337, filed on Jan. 31, 2019.

(51) Int. Cl.
| | |
|---|---|
| *B07C 5/342* | (2006.01) |
| *B07C 5/36* | (2006.01) |
| *A01D 46/00* | (2006.01) |
| *A01D 46/30* | (2006.01) |
| *G06V 20/10* | (2022.01) |
| *G06V 20/68* | (2022.01) |

(52) U.S. Cl.
CPC .......... *B07C 5/3422* (2013.01); *A01D 46/005* (2013.01); *A01D 46/30* (2013.01); *B07C 5/365* (2013.01); *G06V 20/188* (2022.01); *G06V 20/68* (2022.01)

(58) Field of Classification Search
CPC .... B07C 5/3422; B07C 5/365; G06V 20/188; G06V 20/68; A01D 46/005; A01D 46/30
USPC ........................................................ 56/328.1
See application file for complete search history.

(56) References Cited

U.S. PATENT DOCUMENTS

| | | | |
|---|---|---|---|
| 2,789,409 | A | 4/1957 | Crump |
| 5,309,374 | A | 5/1994 | Misra et al. |
| 6,124,560 | A | 9/2000 | Roos et al. |
| 2005/0126144 | A1 | 6/2005 | Koselka et al. |

(Continued)

FOREIGN PATENT DOCUMENTS

| | | | | |
|---|---|---|---|---|
| CN | 108170104 A | * | 6/2018 | |
| DE | 10322809 A1 | * | 12/2004 | ............. A01D 33/08 |

(Continued)

OTHER PUBLICATIONS

International Search Report and Written Opinion of the International Searching Authority for PCT/US20/15795, dated Apr. 23, 2020 (10 pages).

*Primary Examiner* — Terrell H Matthews
(74) *Attorney, Agent, or Firm* — Buchanan Ingersoll & Rooney PC (57) ABSTRACT

Embodiments relate to a crop harvesting apparatus configured to garner or harvest crops from plants via vacuum suction and sort the garnered crops via a quick-switching gate system. A vacuum source generates the vacuum suction for the apparatus so that crops are garnered (or plucked) from the plant via suction through an end-effector, which are then transferred to a crop sorter by way of tubing that has a smooth inner surface. The crop sorter utilizes a gate system that exploits vacuum suction from the vacuum source and gravity to quickly and effectively sort the garnered crops into a hopper and a rejection bin.

18 Claims, 5 Drawing Sheets

(56) References Cited

U.S. PATENT DOCUMENTS

| | | | |
|---|---|---|---|
| 2011/0022231 A1* | 1/2011 | Walker | A01M 7/0042 |
| | | | 901/14 |
| 2014/0142745 A1 | 5/2014 | Johnston et al. | |
| 2020/0246839 A1* | 8/2020 | Chi | A01D 46/005 |
| 2020/0281122 A1* | 9/2020 | Mor | A01D 90/10 |

FOREIGN PATENT DOCUMENTS

| | | | | |
|---|---|---|---|---|
| FR | 3026610 A1 * | 4/2016 | | A23N 12/005 |
| WO | WO-2018191768 A1 * | 10/2018 | | B07C 5/342 |

* cited by examiner

CROP HARVESTING ROBOT

CROSS-REFERENCE TO RELATED APPLICATIONS

This patent application is related to and claims the benefit of U.S. Provisional Patent Application No. 62/799,337, filed on Jan. 31, 2019, the entire contents of which are hereby incorporated by reference in their entirety.

FIELD OF THE INVENTION

Embodiments relate to a crop harvesting apparatus to garner crops from plants via vacuum suction and sort the garnered crops via a quick-switching gate system.

BACKGROUND OF THE INVENTION

Existing crop harvesting systems rely on the use of mechanical grippers, which tend to crush or bruise soft objects (e.g., fruit and vegetables). In addition, existing crop harvesting systems fail to provide the quick locational accuracy demanded by crops being grown in greenhouse environments. This can be attributed to the inability of current vision and identification technology to quickly and effectively recognize the type of object and location of the object in the presence of sunlight of a greenhouse. The organic nature of the object exacerbates this problem.

After the crop has been garnered, conventional crop harvesting systems transfer the garnered crop via flexible tubing that is ribbed. The ribbed nature of the tubing tends to bruise, scrap, or otherwise damage the crop. In addition, existing crop harvesting systems sort the garnered crop via use of directional suction techniques and soft end-effectors. While such sorting may be effective, it is slow and requires a high degree of accuracy.

The present invention is directed at overcoming one or more of the above-mentioned problems.

SUMMARY OF THE INVENTION

Embodiments relate to a crop harvesting apparatus configured to garner crops from plants via vacuum suction and sort the garnered crops via a quick-switching gate system. A vacuum source generates the vacuum suction for the apparatus so that crops are garnered (or picked or plucked) from the plant via suction through an end-effector, which are then transferred to a crop sorter by way of tubing that has a smooth inner surface. The crop sorter utilizes a gate system that exploits vacuum suction from the vacuum source and gravity to quickly and effectively sort the garnered crops into a hopper and a rejection bin. The crop harvesting apparatus is configured to be more suitable for robotic use (e.g., the apparatus can be configured as a robotic unit) in greenhouse environment. For instance, the ability to garner the crops from the plants via vacuum suction reduces the locational accuracy (e.g., determining the coordinates of the crop) that would otherwise be required with conventional harvesting systems. Thus, instead of needing a high degree of locational accuracy for a gripper to grab the crop, the end-effector need only be proximal (e.g., close enough for the vacuum suction to draw the crop from the plant) to harvest the crop.

In addition, the smooth inner surface of the tubing reduces or eliminates any damaged (e.g., scraping, bruising, etc.) to the garnered crop as it is transferred to the crop sorter.

In addition, the vacuum suction and gravity feed transfer of the garnered crops throughout the system obviates the "pick and place" techniques utilized by conventional systems. The pick and place technique requires more time, necessitates a higher degree of accuracy, and dictates more complexity, especially if the system is automated. With the inventive apparatus, there is no need to accurately determine coordinates to facilitate picking an object and placing the object. Thus, harvesting speeds are increased with the use of the inventive system. The vacuum suction and gravity feed transfer in conjunction with the quick-switching gate system further enhances the speed with which the apparatus can harvest crops.

Conventional systems utilize suction and soft end-effectors for sorting, which add to be requisite accuracy and time requirements. The sorting techniques of the inventive apparatus, however, further reduce the degree of accuracy and the time needed for sorting the garnered crops. In addition, obviating the suction and soft end-effectors reduces the probability of damaging the crop during sorting.

The crop harvesting apparatus utilizes a control module programmed to identify crops in greenhouse environments and to facilitate garnering and sorting crops using the mechanics disclosed herein with accuracy and speed. The control module is programmed to use machine learning based vision techniques and object recognition techniques to achieve these accuracy and speeds. Cameras and filters are used to collect light in the visible and non-visible spectrums for analysis by the control module. In addition to controlling the various components of the apparatus for quick and accurate crop harvesting, such information allows the control module to provide highly precise metrics (e.g., early onset disease detection, pest pressure analysis, and yield projection, etc.) of individual crops and their associated plant(s) for further analysis. Thus, an added benefit of the inventive system is having a crop harvesting apparatus that harvested crops and monitors the crops (along with their associated plant(s)) in a single unit.

The limitation plagued by conventional crop harvesting apparatuses, and in particular the limitations identified herein, have heretofore prevented to effective automation of crop harvesting, and particularly crop harvesting in greenhouse environment. As noted above, conventional systems rely on high location accuracy, are slow, and require complexities that render them not feasible for automated crop harvesting.

It will be understood by one skilled in the art, with the benefit of the present disclosure, that embodiments of the apparatus (or embodiments of the components of the apparatus) can be used by groups and industries outside of crop harvesting. For instance, embodiments of the apparatus or a component thereof can be used in the packing industry to retrieve, sort, and/or relocate objects (in particular soft objects) without damaging (crushing, bruising, scraping, etc.) them. As another example, embodiments of the crop sorter component can be used in any application that would benefit from quick-switching in vacuum systems.

In an exemplary embodiment, a crop harvesting apparatus includes a vacuum source and a crop sorter in connection with the vacuum source, the crop sorter configured to sort crops based on at least one criterion. The apparatus includes an end-effector, comprising: an end-effector nozzle having an opening; and a flexible tube facilitating connection of the end-effector to the crop sorter, the flexible tube having a smooth inner surface. The apparatus includes a garnering camera configured to collect information related to the at least one criterion and generate garnering crop criteria data. The apparatus includes a sorting camera configured to collect information related to the at least one criterion and generate sorting crop criteria data. The apparatus includes an actuating system configured to support and position the end-effector. The apparatus includes a control module configured to receive and analyze the garnering crop criteria data and the sorting crop criteria data to identify crops meeting the at least one criterion and crops not meeting the at least one criterion, the at least one criterion being any one or combination of a type, a size, a color, a hue, a ripeness, insect infestation, presence of fungi, presence of bacteria, and presence of spots or discoloration of crops or plants associated with the crops. The control module is configured to perform a first examination using the garnering crop criteria data to determine whether crops meet the at least one criterion or not meet the at least one criterion, and based on the first examination cause the crop harvesting apparatus to selectively garner crops from a plant through the end-effector. The control module is configured to perform a second examination using the sorting crop criteria data to determine whether the garnered crops meet the at least one criterion or not meet the at least one criterion, and based on the second examination cause the crop harvesting apparatus to generate a first path or a second path for the garnered crops, the first path being an acceptance path designated for garnered crops that meet the at least one criterion, and the second path being a rejection path designated for garnered crops that do not meet the at least one criterion.

In some embodiments, the control module is configured to selectively garner crops by causing the actuating system to position the end-effector nozzle proximate to a target crop so that a suction force generated via the vacuum source removes the target crop from the plant, the target crop being identified at meeting the at least one criterion via the first examination.

In some embodiments, the end-effector nozzle opening is angled.

In some embodiments, the end-effector has an inner surface and an outer surface, and the end-effector inner surface has a lip formed at the end-effector nozzle opening and/or a spring element disposed at the end-effector nozzle opening.

In some embodiments, the apparatus includes a camera disposed on the end-effector.

In some embodiments, the apparatus includes a cap removably securable to the end-effector nozzle at the end-effector nozzle opening, wherein securing the cap to the end-effector nozzle reduces a size or modifies a shape of the end-effector nozzle opening.

In some embodiments, the crop sorter comprises a conduit structure the first path is generated by a portion of the conduit structure that facilitates movement of the garnered crops from the end-effector, into a hopper. The second path is generated by a portion of the conduit structure that facilitates movement of the garnered crops from the end-effector, into a reject bin.

In some embodiments, the sorting camera is located within the end effector.

In some embodiments, the crop sorter includes a plurality of gates located within the conduit structure.

In some embodiments, the plurality of gates comprises a first gate, a second gate, and a third gate. The first gate selectively provides fluid communication between the crop sorter and the hopper. The second gate selectively provides fluid communication between the crop sorter and the end effector. The third gate selectively provides fluid communication between the crop sorter and an outlet.

In some embodiments, the first path includes the portion of the conduit structure from the end-effector to the hopper. The second path includes the portion of the conduit structure from the end-effector to the reject bin.

In some embodiments, the control module is configured to control the plurality of gates so that the garnered crops follow the first path and/or the second path based on a combination of gravity and vacuum suction.

In some embodiments, the control module is configured to generate the first path via a first operational stage and a second operational stage. During the first operational stage: the vacuum source generates suction; the second gate is open to provide the generated suction at the end-effector nozzle opening and to facilitate garnering crops from the plant through the end-effector and as soon as the crop passes a first break beam, a second operational stage is initiated where the second gate is closed; and the third gate is open to allow airflow to the vacuum source to prevent overheating; and the first gate opens to allow gravity and momentum of the crop to cause the crop to fall into the hopper.

In some embodiments, the sorting camera is configured to collect information related to the at least one criterion from the garnered crops while the crop is in the end-effector.

In some embodiments, the control module is configured to generate the second path via a first operational stage and a second operational stage. During the first operational stage: the vacuum source generates suction; the second gate is open to provide the generated suction at the end-effector nozzle opening and to facilitate garnering crops from the plant through the end-effector; and as soon as the crop passes a first break beam the first gate opens, allowing vacuum suction to bring the crop along the second path into a reject bin.

In some embodiments, each gate of the plurality of gates includes a first plate having a first plate conduit aperture and a first plate spindle aperture, the first plate conduit aperture being in-line with the conduit structure. Each gate further includes a disk having a disk spindle aperture, the disk being configured to be placed adjacent the first plate. Each gate further includes a second plate having a second plate conduit aperture and a second plate spindle aperture, the second plate being configured to be placed adjacent the ring, the second plate conduit aperture being in-line with the conduit structure. Each gate further includes two o-rings to seal between the first plate, the disk, and the second plate. Each gate further includes a gate motor having a spindle, the gate motor being configured to be placed adjacent the first plate. Each gate further includes a gate motor collar configured to be placed adjacent the disk. The first plate conduit aperture and a first plate spindle aperture are configured to limit rotational motion of the disk. The spindle extends through the first plate spindle aperture and the disk spindle aperture to engage with the gate motor collar so that the gate motor collar securely retains the first plate and the disk in position. The first plate spindle aperture allows for free rotation of the spindle. The shaft collar aperture engages the spindle and the disk so that rotation of the spindle causes rotation of the disk. When the gate motor causes the spindle to rotate, the disk rotates to obstruct or unobstruct the conduit structure.

Some embodiments include a propulsion motor configured to cause the crop harvesting apparatus to traverse a ground surface.

In an exemplary embodiment, an end-effector for a vacuum collection apparatus includes an end-effector nozzle having a first end, a second end, an inner surface, and an outer surface, the first end having an angled opening. The apparatus further includes a lip formed on the inner surface at the first end and/or a spring disposed on the inner surface at the first end. The apparatus further includes a flexible tube connected to the second end, the flexible tube having a smooth inner surface.

In an exemplary embodiment, a gate apparatus includes a first plate having a first plate conduit aperture and a first plate spindle aperture, the first plate conduit aperture being in-line with the conduit structure. The apparatus further includes a disk having a disk spindle aperture, the disk being configured to be placed adjacent the first plate. The apparatus further includes a second plate having a second plate conduit aperture the second plate being configured to be placed adjacent the first plate, the second plate conduit aperture being in-line with the conduit structure. The apparatus further includes a gate motor having a spindle, the gate motor being configured to be placed adjacent the first plate. The apparatus further includes a gate motor collar configured to be placed adjacent the disk. The apparatus further includes two o-rings to seal between the first plate, the disk, and the second plate. The spindle extends through the first plate spindle aperture and the disk spindle aperture to engage with the gate motor collar so that the gate motor collar securely retains the first plate and the disk in position. The first plate spindle aperture allows for free rotation of the spindle. The disk spindle aperture and the shaft collar engage the spindle so that rotation of the spindle causes rotation of the disk. When the gate motor causes the spindle to rotate, the disk rotates to obstruct or unobstruct the conduit structure.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which:

FIGS. 2A-2B show an embodiment of an end-effector that can be used with the crop harvesting apparatus, where FIG. 2A shows a cap attached to the end-effector and FIG. 2B shows the cap removed from the end-effector;

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
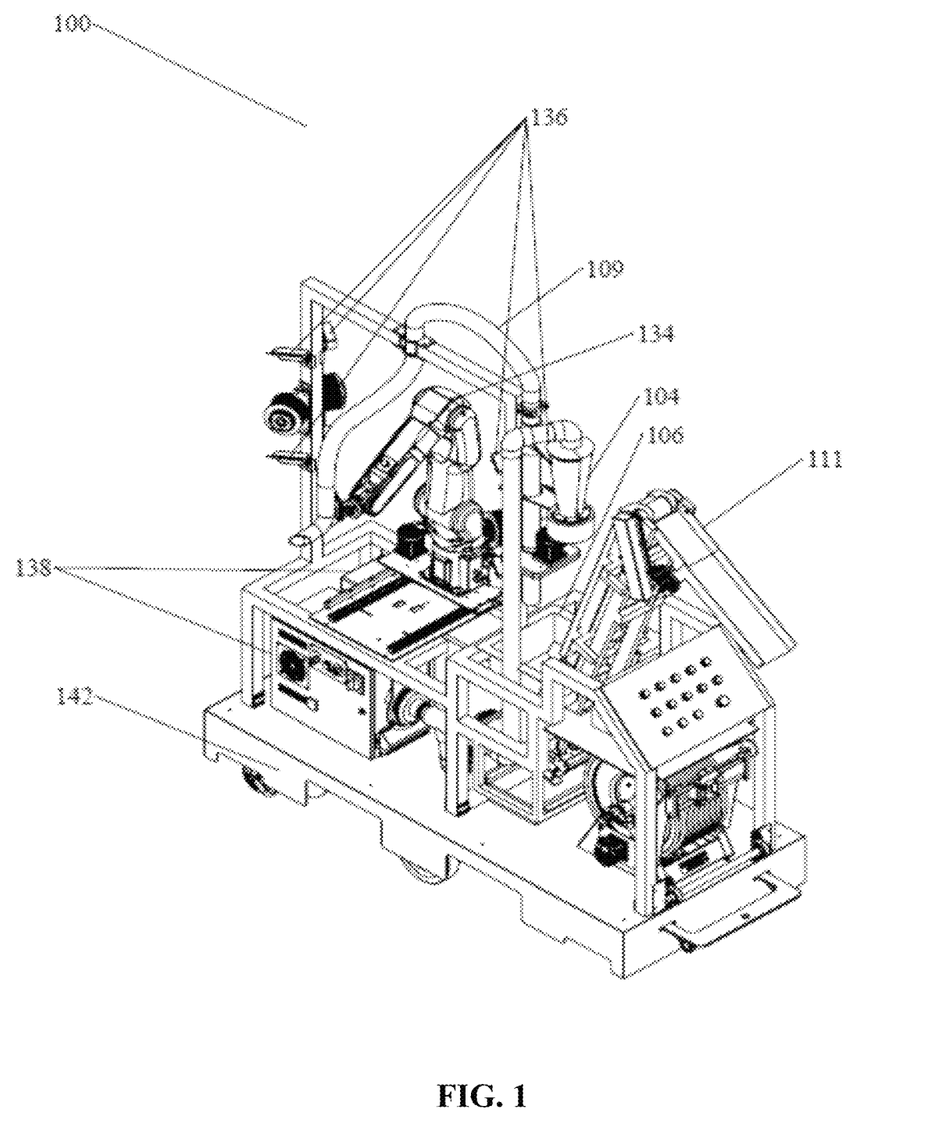
FIG. 1 shows an embodiment of the crop harvesting apparatus configured as a robotic unit.

Referring to FIG. 1, embodiments of the crop harvesting apparatus are configured to garner objects from via vacuum suction and sort the garnered objects via a quick-switching gate system. While embodiments disclose the apparatus for use to garner crops (e.g. crops, fruit, vegetables, etc.), the apparatus can be used to garner and sort other objects, such as soft objects, delicate objects, etc. The vacuum source generates the vacuum suction for the apparatus so that crops are garnered (or picked or plucked) from a plant via suction through an end-effector, which are the transferred to a crop sorter by way of tubing that has a smooth inner surface. The crop sorter utilizes a gate system that exploits vacuum suction from the vacuum source and gravity to quickly and effectively sort the garnered crops into a hopper and a rejection bin.

The crop harvesting apparatus 100 includes a vacuum source 102. The vacuum source 102 can be a pump, compressor, vacuum motor, etc.; essentially any device that can create vacuum suction.

Figure 3:
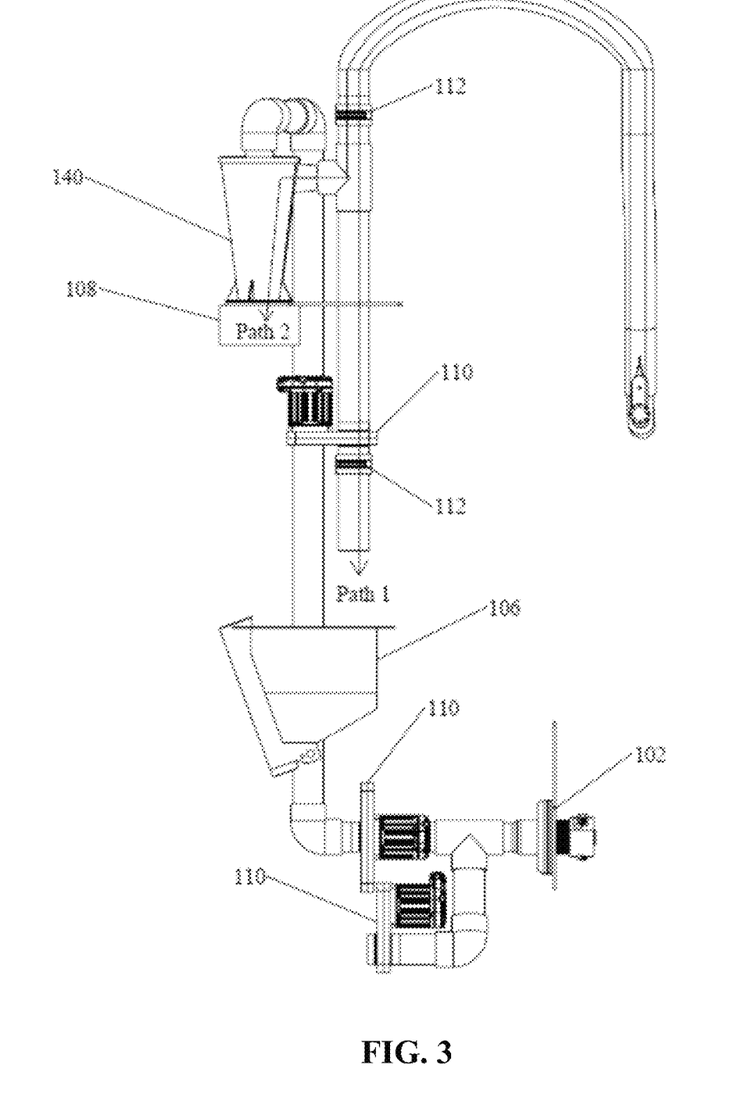
FIG. 3 shows an exemplary schematic of an embodiment of a crop sorter that can be used with the crop harvesting apparatus.

Referring to FIG. 3, the apparatus 100 further includes a crop sorter 104 in connection with the vacuum source 102. The crop sorter 104 is configured to sort crops based on at least one criterion. The crop sorter 104 moves crops (e.g., tomatoes) either in path one or path two. Path one ends inside the hopper 106, which is connected to a conveyor 111 that transfers the tomatoes to a packing cart. Path two ends in the rejection bin 108.

In some embodiments, the crop sorter 104 has a plurality of gates 110 located within the conduit structure. The plurality of gates 110 can include a first gate, a second gate, and a third gate. There are two break beams 112, three gates 110, and a vacuum source 102 that moves garnered crop. A crop will travel in path-1 into the hopper 106 if it's deemed an acceptable crop. The conveyor 111 will then move that crop from the hopper 106 to the packing cart. A crop will travel along path-2 into the reject bin if it's deemed an unacceptable crop.

The way a crop is moved along path-1 is using break beam-1, break beam-2, gate-1, gate-2, and gate-3. As soon as break beam-1 senses the crop passed, vacuum to the end effector 114 is cut off by closing gate-2 and opening gate-3. At the same time, gate-1 opens to let the crop exit the system into the hopper 106. When break beam-2 senses that the crop has passed by it closes the gate immediately. The way a crop is moved along path-2 is also using the same setup as before. As soon as the crop passes break beam-1, air is sent through gate-1 by opening gate-1. This makes the crop get sucked into the cyclone and into the reject bin 108.

Figure 4:
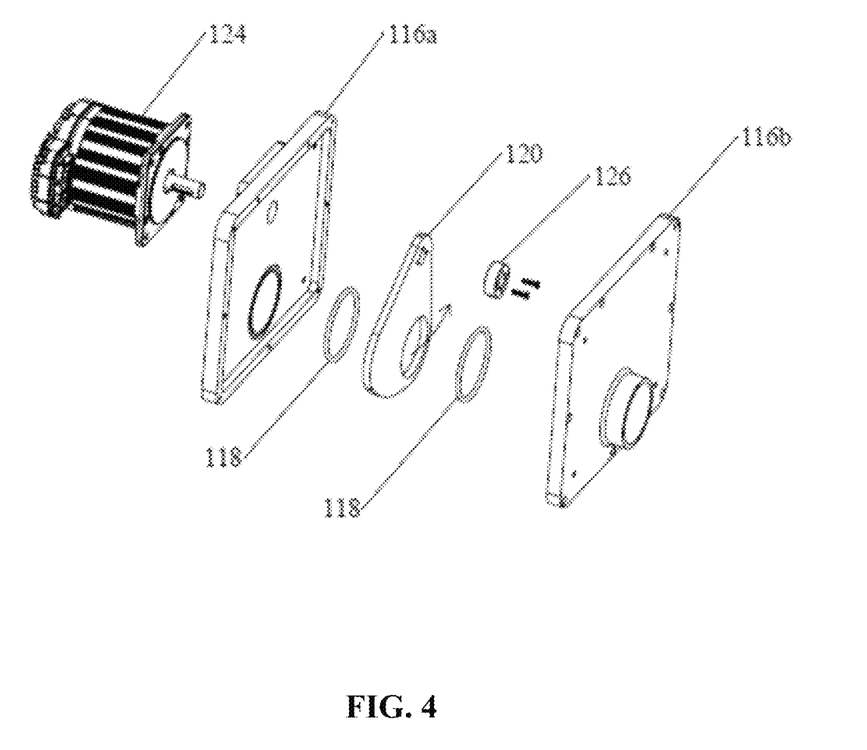
FIG. 4 shows an embodiment of a gate that can be used with the crop sorter.

Referring to FIG. 4, each gate 110 of the plurality of gates 110 can include a first plate 116*a*, two o-rings 118, a disk 120, a second plate 116*b*, a gate motor 124, and a gate motor collar 126. The first plate 116*a* has a first plate conduit aperture and a first plate spindle aperture, the first plate conduit aperture being in-line with the conduit structure. Being in-line can include being co-axial. The disk 120 has a disk spindle aperture. The disk 120 in the gate 110 is configured to be placed within the first plate 116*a*. The rotation is therefore limited by the first plate 116*a*. The second plate 116*b* has a second plate conduit aperture. The second plate 116*b* in the gate 110 is configured to be placed adjacent the first plate 116*a*. The second plate conduit aperture is in-line with the conduit structure. In some embodiments, the first plate conduit aperture is in-line with the second plate conduit aperture so as to form the conduit structure within the gate 110. The gate motor 124 has a spindle, and the gate motor 124 is configured to be placed adjacent the first plate 116*a*. The gate motor collar 126 is configured to be placed adjacent the disk 120. The spindle of the gate motor 124 extends through the first plate spindle aperture and the disk spindle aperture to engage with the gate motor collar 126 so that the gate motor collar 126 securely retains the first plate 116*a* and the disk 120 in position. The first plate spindle aperture allows for free rotation of the spindle. The gate motor collar 126 engages the spindle and the disk spindle aperture so that rotation of the spindle causes rotation of the disk 120. When the gate motor 124 causes the spindle to rotate, the disk 120 rotates to obstruct or unobstruct the conduit structure. Obstructing the conduit structure involves preventing objects (e.g., crops) and/or preventing fluid flow (e.g., air being forced by the vacuum source 102) from passing through the conduit structure. Similarly, unobstructing the conduit structure involves allowing objects (e.g., crops) and/or allowing fluid flow (e.g., air being forced by the vacuum source 102) to pass through the conduit structure.

Figure 2A:
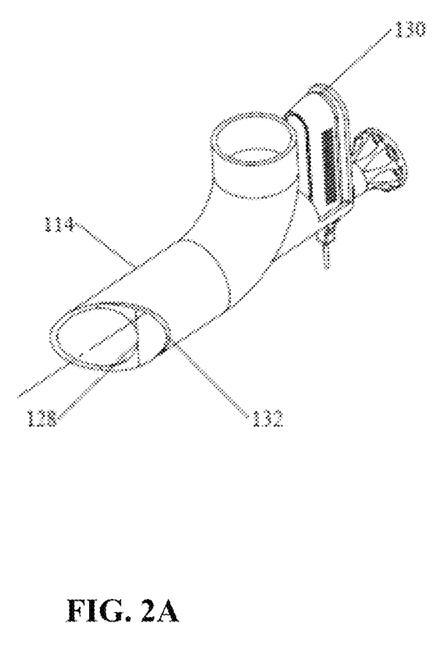
Figure 2B:
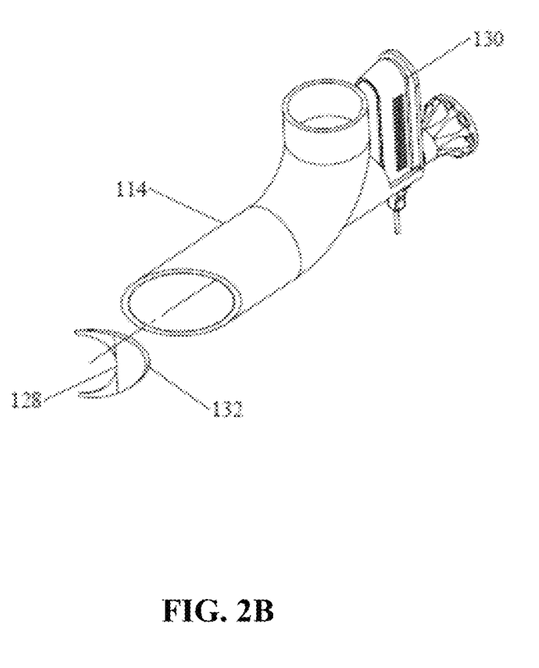

Referring to FIGS. 2A-2B, the apparatus further includes an end-effector 114. The end-effector has an end-effector nozzle with an opening. The end-effector 114 also has a flexible tube 109 facilitating connection of the end-effector 114 to the crop sorter 104. It is contemplated for the flexible tube 109 to have a smooth inner surface. In some embodiments, the end-effector nozzle opening is angled. For instance, the end-effector 114 can have an end-effector nozzle with a first end, a second end, an inner surface, and an outer surface. The flexible tube 109 can be connected to the second end. The first end preferably has the angled opening, which can be any angle that is not perpendicular. For example, the angle can range from 30-degrees to 60-degrees, and in a preferred form is approximately 45-degrees. Of course, other angles and angle ranges are also contemplated (including perpendicular) depending on the crop or object to be garnered.

Garnering the targeted crops occurs via suction of the crop through the angled opening. This angle allows the end-effector 114 to more easily navigate clustered greenhouse environments. In some embodiments, the end-effector inner surface has a lip 128 formed at the end-effector nozzle opening, and/or a torsion spring (or spring-like element). For instance, the lip 128 and/or spring can be formed on the inner surface at the first end. This lip 128 can provide for improved harvesting accuracy, via an ensured harvest. For fruits/vegetables which are tightly connected to the plant, the additional lip/spring ensures proper harvesting through the passive "grabbing" of the fruit/vegetable.

Some embodiments of the apparatus have a camera 130 disposed on the end-effector 114.

Some embodiments of the apparatus include a cap 132 removably securable to the end-effector nozzle at the end-effector nozzle opening or at the first end. Securing the cap 132 to the end-effector nozzle reduces a size or modifies a shape of the end-effector nozzle opening. This can be done to control the type, shape, and size of the crop being garnered from the plant.

The apparatus has an actuating system 134 configured to support and position the end-effector 114. In an exemplary embodiment, the actuating system 134 is configured as a robotic arm.

The apparatus 100 has a garnering camera 136 configured to collect information related to the criterion and generate garnering crop criteria data. The apparatus 100 also has a sorting camera configured to collect information related to the criterion and generate sorting crop criteria data. Any of the garnering camera 136 and the sorting camera can be configured to collect light in the visible and non-visible spectrums from the crop and/or the plant associated with the crop for analysis. Any of the cameras disclosed herein can be any one or combination of high resolution visible spectrum camera, stereo camera, and other spectrum camera.

In some embodiments, the sorting camera is located within the first crop sorter segment. In some embodiments, the garnering camera 136 is located on the actuating system 134, the end-effector 114, or other portion of the apparatus 100.

The apparatus 100 has a control module 138 (e.g., a processor or computer device) configured to receive and analyze the garnering crop criteria data and/or the sorting crop criteria data. The control module 138 identifies crops meeting the criterion (or criteria) and crops not meeting the criterion (or criteria). The criterion (or criteria) can be any one or combination of a type, a size, a color, a hue, a ripeness, insect infestation, presence of fungi, presence of bacteria, and presence of spots or discoloration of crops or plants associated with the crops. The control module 138 is configured to perform a first examination using the garnering crop criteria data to determine whether crops meet the criterion or not meet the criterion. Based on the first examination, the control module 138 causes the crop harvesting apparatus 100 to selectively garner crops from a plant through the end-effector 114. The control module 138 is configured to perform a second examination using the sorting crop criteria data to determine whether the garnered crops meet the criterion or not meet the criterion. Based on the second examination, the control module 138 causes the crop harvesting apparatus 100 to generate a first path or a second path for the garnered crops. The first path is an acceptance path designated for garnered crops that meet the criterion. The second path is a rejection path designated for garnered crops that do not meet the criterion.

The control module 138 is configured to selectively garner crops by causing the actuating system 134 to position the end-effector nozzle proximate to a target crop so that a suction force generated via the vacuum source 102 removes the target crop from the plant, the target crop being identified at meeting the criterion via the first examination.

Figure 5:
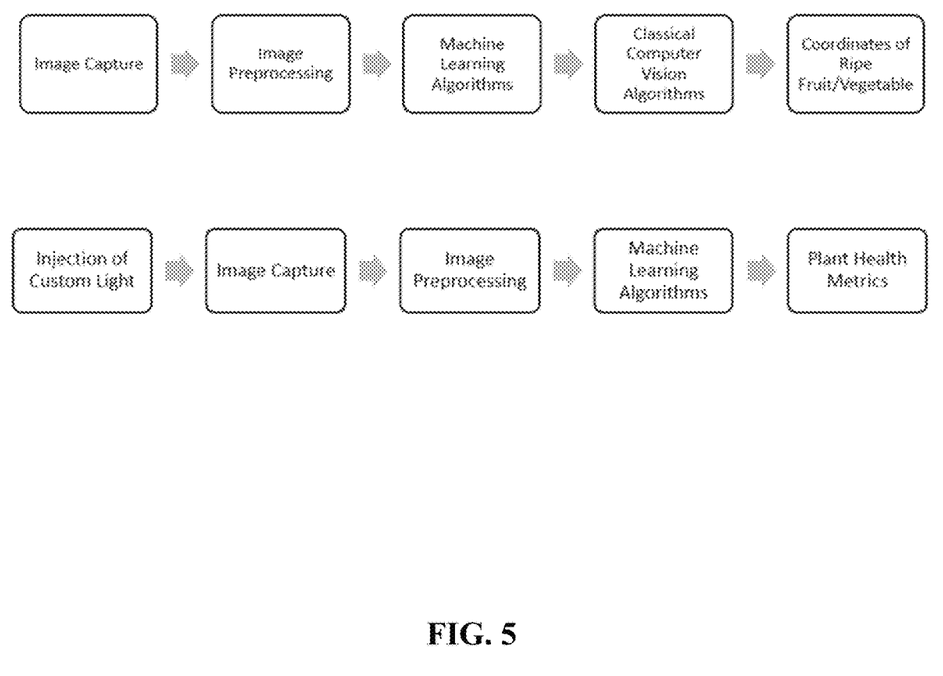
FIG. 5 shows a process flow diagram that can be used by a control module of the crop harvesting apparatus.

The control module 138 is configured to control the plurality of gates 110 so that the garnered crops follow the first path and/or the second path based on a combination of gravity and vacuum suction. It is contemplated for the control module 138 to be configured to generate the first path via a first operational stage and a second operational stage. During the first operational stage, the vacuum source 102 generates suction. The second gate 110 is open to provide the generated suction at the end-effector nozzle opening and to facilitate garnering crops from the plant through the end-effector 114. When the crop passes the break beam-1 that triggers the second operational stage, the vacuum source 102 generates suction. The second gate 110 is closed to eliminate vacuum suction being generated in the end-effector 114. The first gate 110 is open to allow gravity to force the garnered cops to fall into the hopper 106. The third gate 110 is open allowing air outside of the crop sorter 104 to enter the crop sorter 104 and be routed to the vacuum source 102 so as to prevent overheating of the vacuum source 102. All three gates 110 switching is done within 60 milliseconds while the crop is still falling through the section between break beam-1 and the first gate 110. This happens so fast that the crop never touches the disk in first gate 110. If it wasn't for the gates 110 being able to open so fast the crop would slam against the disk 120 of the first gate 110 and turn into juice. After the crop passes by break beam-2 the gates 110 return to the first operational stage and allows more crops to be harvested.

It is contemplated for the control module 138 to be configured to generate the second path via a first operational stage and a second operational stage. During the first operational stage, the vacuum source 102 generates suction. The second gate 110 is open to provide the generated suction at the end-effector nozzle opening and to facilitate garnering crops from the plant through the end-effector 114. When the crop passes the first break beam that triggers the second operational stage, the first gate 110 is open, the second gate 110 is open, and the third gate 110 is closed so that vacuum suction draws the garnered crops into the cyclone 140 and into the rejection bin 108.

The garnering and sorting of crops is based on them meeting the criterion (or criteria). As noted above, the criterion (or criteria) can be any one or combination of a type, a size, a color, a hue, a ripeness, insect infestation, presence of fungi, presence of bacteria, and presence of spots or discoloration of crops or plants associated with the crops. For instance, the garnering crop criteria data and sorting crop criteria data can include information about the crop or the plant related to any one or combination of these criteria. The control module 138 is programmed to use machine learning based vision techniques and object recognition techniques (e.g., Gabor filtering, image smoothing and processing, etc.) to process these data. The control module 138 can further be programmed to use time of year, the season, the desired ripeness (e.g., this can be determined by analyzing the shape, size, and color of data collected via the visible light spectrum), the maximization of product yield, etc. as factors to determine if the crop should be garnered or how it should be sorted.

As noted herein, it is contemplate for the crop harvesting apparatus 100 to be used to harvest the crops in an autonomous manner (fully autonomous or semi-autonomous). This can be achieved by configuring the crop harvesting apparatus 100 as a robotic unit. The robotic unit has a propulsion motor configured to cause the crop harvesting apparatus 100 to traverse a ground surface. For example, the propulsion motor can be configured to work in connection with a drivetrain to drive at least one wheel or tread to allow the robotic unit to traverse a track that sits adjacent to a row of crops. In an exemplary embodiment, the robotic unit is structured as a cart having a wheeled carriage 142 configured to traverse a track located on a floor of a greenhouse. The propulsion motor (e.g., an electric motor) is in connection with the wheeled carriage 142 via the drivetrain. The crop harvesting apparatus 100 is connected to the cart so that as the robotic unit traverses the tracks, the crop harvesting apparatus 100 is moved along with the robotic unit. The control module 138 is configured to control the propulsion motor, the vacuum source 102, the gates 110 of the crop sorter 104, the garnering and sorting cameras 136, and the actuating system 134 to facilitate garnering and sorting crops from the various plants located within the greenhouse.

As the control module 138 causes the robotic unit to traverse the tracks, it causes the garnering camera 136 to collect the garnering crop criteria data for analysis. The garnering crop criteria data can also include information about the location of the crop to be garnered (e.g., the targeted crop). This information is converted into coordinates so that the control module 138 causes the robotic unit to stop and/or causes the actuating system 134 to move the end-effector 114 to be proximate the targeted crop. Once the end-effector 114 is proximate the targeted crop, the control module 138 activates the vacuum source 102 to generate the vacuum suction in the crop sorter 104 and the end-effector 114. The control module 138 then generates the first and/or second paths in the crop sorter 104 so that the targeted crops are garnered in accordance with the first examination and subsequently sorted in accordance with the second examination. The specific configuration of the gates 110 and the vacuum suction/gravity feed flow mechanism provides quick gate switching for the sorting of crops as they are being garnered. For instance, the gates 110 can be switched from the obstructed to unobstructed state or vice versa as quickly as 0.060 second (with the gate motor operating at 3000 rpm).

As noted herein, the apparatus 100 can be used to also monitor aspects of the plants associated with the crops. For instance, the control module 138 can be programmed to perform a plant monitoring perception examination based on the data collected (which can include information about the crops and/or the plants) from the cameras. As the robotic unit moves through the environment, its location can be tracked. This tracking can be used to identify the location of certain plants exhibiting early onset-disease, variations in yield projection, pest pressure analysis, etc.

It should be understood that modifications to the embodiments disclosed herein can be made to meet a particular set of design criteria. For instance, the number of end-effectors 114, actuating systems 134, crop sorters 104, gates 110, control modules 138, and other components can be any suitable number of each to meet a particular objective. The particular configuration of type of such elements can also be adjusted to meet a particular set of design criteria. Therefore, while certain exemplary embodiments of the apparatus and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A crop harvesting apparatus, comprising:
    a vacuum source;
    an end-effector, comprising:
        an end-effector nozzle having an opening; and
        a flexible tube facilitating connection of the end-effector to the vacuum source, the flexible tube having a smooth inner surface;
    a garnering camera configured to collect information related to at least one criterion and generate garnering crop criteria data;
    an actuating system configured to support and position the end-effector;
    a control module configured to receive and analyze the garnering crop criteria data to identify crops meeting the at least one criterion and crops not meeting the at least one criterion, the at least one criterion being any one or combination of a type, a size, a color, a hue, a ripeness, insect infestation, presence of fungi, presence of bacteria, and presence of spots or discoloration of crops or plants associated with the crops;

wherein:
the control module is configured to perform a first examination using the garnering crop criteria data to determine whether crops meet the at least one criterion or not meet the at least one criterion, and based on the first examination cause the crop harvesting apparatus to selectively garner crops from a plant through the end-effector.

2. The crop harvesting apparatus recited in claim 1, wherein the control module is configured to selectively garner crops by causing the actuating system to position the end-effector nozzle proximate to a target crop so that a suction force generated via the vacuum source removes the target crop from the plant, the target crop being identified at meeting the at least one criterion via the first examination.

3. The crop harvesting apparatus recited in claim 1, wherein the end-effector nozzle opening is angled.

4. The crop harvesting apparatus recited in claim 1, wherein the end-effector has an inner surface and an outer surface, and the end-effector inner surface has a lip formed at the end-effector nozzle opening and/or a spring element disposed at the end-effector nozzle opening.

5. The crop harvesting apparatus recited in claim 1, further comprising a camera disposed on the end-effector.

6. The crop harvesting apparatus recited in claim 1, further comprising a cap removably securable to the end-effector nozzle at the end-effector nozzle opening, wherein securing the cap to the end-effector nozzle reduces a size or modifies a shape of the end-effector nozzle opening.

7. The crop harvesting apparatus recited in claim 1, further comprising: a crop sorter in connection with the vacuum source, the crop sorter configured to sort crops based on the at least one criterion; and a sorting camera configured to collect information related to the at least one criterion and generate sorting crop criteria data, wherein the control module is configured to perform a second examination using the sorting crop criteria data to determine whether the garnered crops meet the at least one criterion or not meet the at least one criterion, and based on the second examination cause the crop harvesting apparatus to generate a first path or a second path for the garnered crops, the first path being an acceptance path designated for garnered crops that meet the at least one criterion, and the second path being a rejection path designated for garnered crops that do not meet the at least one criterion; wherein the crop sorter comprises a conduit structure, the first path is generated by a portion of the conduit structure that facilitates movement of the garnered crops from the end-effector, into a hopper, the second path is generated by a portion of the conduit structure that facilitates movement of the garnered crops from the end-effector, into a reject bin.

8. The crop harvesting apparatus recited in claim 7, wherein the sorting camera is located within the end effector.

9. The crop harvesting apparatus recited in claim 7, wherein the crop sorter comprises a plurality of gates located within the conduit structure.

10. The crop harvesting apparatus recited in claim 9, wherein:
the plurality of gates comprises a first gate, a second gate, and a third gate;
the first gate selectively provides fluid communication between the crop sorter and the hopper,
the second gate selectively provides fluid communication between the crop sorter and the end effector,
the third gate selectively provides fluid communication between the crop sorter and an outlet.

11. The crop harvesting apparatus recited in claim 10, wherein:
the first path includes the portion of the conduit structure from the end-effector to the hopper; and
the second path includes the portion of the conduit structure from the end-effector to the reject bin.

12. The crop harvesting apparatus recited in claim 11, wherein the control module is configured to control the plurality of gates so that the garnered crops follow the first path and/or the second path based on a combination of gravity and vacuum suction.

13. The crop harvesting apparatus recited in claim 12, wherein:
the control module is configured to generate the first path via a first operational stage and a second operational stage;
during the first operational stage:
the vacuum source generates suction;
the second gate is open to provide the generated suction at the end-effector nozzle opening and to facilitate garnering crops from the plant through the end-effector; and
as soon as the crop passes a first break beam, a second operational stage is initiated where the second gate is closed; and
the third gate is open to allow airflow to the vacuum source to prevent overheating; and
the first gate opens to allow gravity and momentum of the crop to cause the crop to fall into the hopper.

14. The crop harvesting apparatus recited in claim 13, wherein the sorting camera is configured to collect information related to the at least one criterion from the garnered crops while the crop is in the end-effector.

15. The crop harvesting apparatus recited in claim 1, wherein:
the control module is configured to generate the second path via a first operational stage and a second operational stage;
during the first operational stage:
the vacuum source generates suction;
the second gate is open to provide the generated suction at the end-effector nozzle opening and to facilitate garnering crops from the plant through the end-effector; and
as soon as the crop passes a first break beam the first gate opens, allowing vacuum suction to bring the crop along the second path into a reject bin.

16. The crop harvesting apparatus recited in claim 9, wherein each gate of the plurality of gates comprises:
a first plate having a first plate conduit aperture and a first plate spindle aperture, the first plate conduit aperture being in-line with the conduit structure;
a disk having a disk spindle aperture, the disk being configured to be placed adjacent the first plate;
a second plate having a second plate conduit aperture, the second plate being configured to be placed adjacent the first plate, the second plate conduit aperture being in-line with the conduit structure;
two o-rings to seal between the first plate, the disk, and the second plate;
a gate motor having a spindle, the gate motor being configured to be placed adjacent the first plate; and
a gate motor collar configured to be placed adjacent the disk;

wherein the first plate conduit aperture and a first plate spindle aperture are configured to limit rotational motion of the disk;

wherein the spindle extends through the first plate spindle aperture and the disk spindle aperture to engage with the gate motor collar so that the gate motor collar securely retains the first plate and the disk in position;

wherein the first plate spindle aperture allows for free rotation of the spindle;

wherein the shaft collar spindle aperture engages the disk spindle aperture and the spindle so that rotation of the spindle causes rotation of the disk; and wherein when the gate motor causes the spindle to rotate, the disk rotates to obstruct or unobstruct the conduit structure.

17. The crop harvesting apparatus recited in claim 1, further comprising a propulsion motor configured to cause the crop harvesting apparatus to traverse a ground surface.

18. The crop harvesting apparatus recited in claim 1, further comprising:
- a crop sorter in connection with the vacuum source, the crop sorter configured to sort crops based on the at least one criterion; and
- a sorting camera configured to collect information related to the at least one criterion and generate sorting crop criteria data,
- wherein the control module is configured to perform a second examination using the sorting crop criteria data to determine whether the garnered crops meet the at least one criterion or not meet the at least one criterion, and based on the second examination cause the crop harvesting apparatus to generate a first path or a second path for the garnered crops, the first path being an acceptance path designated for garnered crops that meet the at least one criterion, and the second path being a rejection path designated for garnered crops that do not meet the at least one criterion.

\* \* \* \* \*